Feb. 16, 1943. J. MUHR 2,311,457
RADIATOR PROTECTOR
Filed Jan. 28, 1939
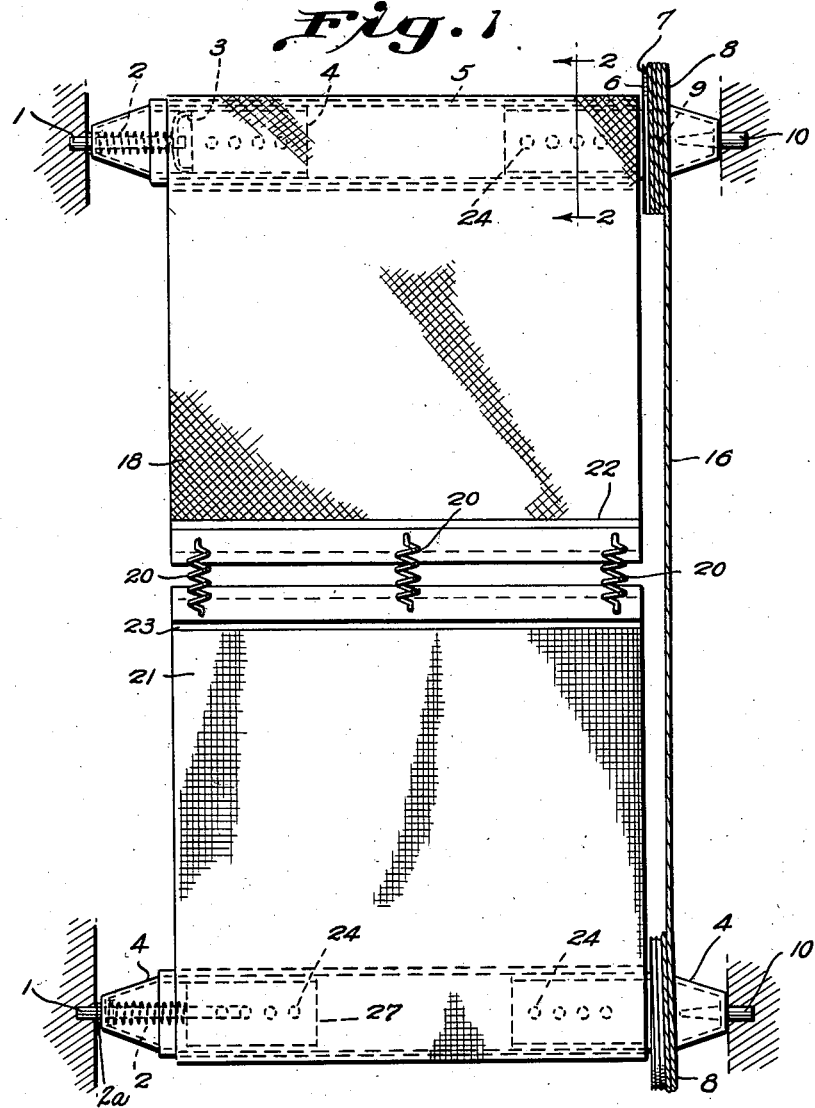
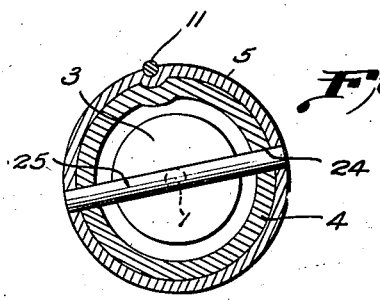

Patented Feb. 16, 1943

2,311,457

UNITED STATES PATENT OFFICE 2,311,457

RADIATOR PROTECTOR

John Muhr, Osborn, Ohio

Application January 28, 1939, Serial No. 253,323

3 Claims. (Cl. 160—122)

This invention relates to a radiator protector and more particularly to a radiator protector that may be used as a bug screen in summer and as an adjustable radiator winter front in winter.

An object of this invention is to provide an adjustable radiator winter front and bug screen combination that is convenient, practical, efficient in controlling the motor temperature, that increases the efficiency of the motor, that may be used to control the motor temperature at a pre-determined level and that may be used to increase the temperature of the motor so as to provide a greater amount of heat to be dissipated through the water heater for the benefit of the occupants of the motor vehicle.

Another object of this invention is to provide a winter front and bug screen combination that may be installed behind the conventional exposed grill so as to close the radiator to any pre-determined degree, which winter front is controllable from the instrument board.

Another object of this invention is to provide a winter front and bug screen combination that is easily manufactured, cheap, easy to install and which requires no servicing attention after the original installation.

Other objects and advantages reside in the construction of parts, the combination thereof and the mode of operation, as will become more apparent from the following description.

In the drawings Figure 1 discloses a front elevational view of the winter front-bug screen assembly, with the bug screen overlying approximately half of the space between the reels and the impervious shield overlying the remaining distance between the reels.

Figure 2 is an enlarged cross sectional view taken substantially on the line 2—2 of Figure 1 with the screen removed.

In the past, winter fronts have been applied to the outside of the grill. Such winter fronts do not completely insulate the radiator and the motor against cold air blasts. After starting the motor, it may heat, requiring the driver to stop and open the winter front. Furthermore, only a portion of the conventional style winter front is variable in area. That being the case, on milder days, too large a portion of the radiator may be insulated, resulting in the engine overheating.

Some makes of motor vehicles, such as Packard, La Salle, Cadillac, et cetera, have been provided with thermostatically controlled shutters which close when the temperature of the radiator of the motor drops to a pre-determined temperature and open when the temperature of the motor has increased to a pre-determined temperature. This thermostatic control, which operates regardless of the outside temperature, allows no marginal control under cold weather conditions to allow for a higher motor temperature dissipated through the motor vehicle heater. Furthermore, the driver of a motor vehicle equipped with thermostatic control shutters cannot close the shutters when parking the motor vehicle, as the shutters will not close until the temperature of the motor and the radiator has dropped to a pre-determined temperature, at which time the shutters are automatically closed. That being the case, this type of automatic shutters permits the engine to cool very rapidly until the shutters are closed, thereby rapidly dissipating the heat from the motor and the radiator, irrespective of how desirable it may be to preserve the heat so as to keep the engine and the radiator warm over a long period of time.

Bug screens have been used in the past; but these have not been combined with a winter front. Instead, it has been common practice to install the bug screen on the outside of the grill for summer use, when fall arrives remove the bug screen, and when cold weather sets in mount the winter front on the outside of the grill. In many cases, both the bug screen and the winter front detract from the appearance of the motor vehicle.

In the device disclosed herein an adjustable radiator winter front and bug screen combination mounted as a unit for use in automobiles, trucks and busses offers to the motorist a practical and efficient control over the motor temperature, so as to obtain the greatest motor efficiency. Furthermore, this arrangement permits the generation of any suitable quantity of heat to be dissipated by the heater for the benefit of the occupants of the motor vehicle. This adjustable winter front and bug screen combination is mounted as a unit between the grill and the radiator. When it has once been installed, it is not necessary to remove it in changing from winter to summer driving and vice versa. Mounting the winter front and the bug screen combination between the grill and the radiator does not detract from the original appearance of the motor vehicle, in that the winter front and the bug screen are practically concealed or entirely concealed, as the case may be, by the grill of the motor vehicle. Due to the flexibility and the ease of adjustment of the relative area covered by the winter front, the winter front may be adjusted while parking the motor vehicle to cover the entire radiator, thereby maintaining the cooling fluid in the radiator and maintaining the engine at a higher temperature over a long period of time. When again starting the motor, it is merely necessary to open the winter front to any desired level, depending upon weather conditions and the desires of the driver and the occupants of the motor vehicle.

Referring to the drawings, the reference character 5 indicates a cylindrical member used as the main body portion of a reel or spool supporting the winter front and bug screen assembly. Metallic tubular members 4, tapering at the outer end, are telescopically arranged with respect to the reel 5. There is one tubular member 4 for each end of the reel. Member 4 shown to the right of Figure 1, supports a pintle 10, forming a journal for one end of the reel. Member 4, shown to the left of Figure 1, is provided with a dish-shaped abutment member 3, cooperating with the end of the reel to support a pin 1. This pin 1 is normally urged outwardly by a spring 2 seated against a collar 2a on the pin 1. The reel may be mounted in position by the use of bearings, one for the pin 1 and one for the pintle 10. The telescopic arrangement of the sleeves 4 with respect to the cylindrical reel 5 permits axial adjustment, so that the same reel assembly will accommodate various widths of radiators requiring corresponding widths of protection elements.

As may best be seen by referring to the bottom of Figure 1, instead of dish-shaped member 3, a wooden block 27 may be used. Members 4 may be provided with a series of apertures 24 for receiving suitable pins or studs 25, as best seen in Figure 2, for holding the reel assembly in any adjusted position. The stud 25 may be removed to permit adjustment of the telescopically arranged members and reinserted when the members have been adjusted to the proper position.

The upper reel 5, as shown in Figure 1, has attached thereto the waterproof winter front member 18. The end of this winter front member 18 is positioned in the longitudinal groove in member 5 and held in position by a wire-like locking member 11. The lower reel 5 supports one end of the bug screen 21 partially rolled thereon. The free end of the winter front 18 is attached to the free end of the screen 21 by a plurality of springs 20. The free ends of members 18 and 21 are preferably provided with reenforcing members 22 and 23. Metallic members 22 and 23 are substantially U-shaped in cross sectional area, so as to form bights clamping the ends of the members 18 and 21.

It can be readily seen that the winter front and the screen may be adjusted by rotating in unison the upper and lower reels 5, thereby unwinding one and winding the other. By raising or lowering the winter front and the screen, which are attached end to end by the springs 20, the rate of radiation or cooling of the water in the radiator may be controlled.

A pair of pulleys 8, one for the upper member 4 and one for the lower member 4, are keyed thereto for rotation therewith. A cable 16 has one end fixedly attached to the lower pulley 8 and the other end fixedly attached to the upper pulley 8, so that as the bug screen is adjusted from one position to another by means of a pulley 6 supporting a suitable cable 7, the cable 16 rotates the two pulleys in unison. This actuating mechanism is not described in detail for the reason that it per se does not form a part of the subject matter claimed in the appended claims.

Although the preferred modification of the device has been described, it will be understood that within the purview of this invention various changes may be made in the form, details, proportion and arrangement of parts, the combination thereof and mode of operation, which generally stated consists in a device capable of carrying out the objects set forth, as disclosed and defined in the appended claims.

I claim:

1. An adjustable screen assembly adapted to be removably attached to a mounting by the use of a pair of parallel rolls adjusted in unison, each of said rolls including the combination of a tubular body member having a pair of diametrically disposed apertures adjacent each end thereof with a pair of tubular end members one for each end of the tubular body member, each of said end members being provided with a plurality of apertures, a selected aperture in each end member registering with an adjacent aperture in the tubular body member, the length of the roll depending upon which apertures are selected, means extending through said registering apertures to hold the end member in adjusted position with respect to the tubular body member, and a pair of pintles, one for each of the end members, projecting beyond the end members, said pintles functioning as bearings for the roll.

2. An adjustable screen assembly adapted to be removably attached to a mounting by the use of a pair of parallel rolls adjusted in unison, each of said rolls including the combination of a tubular body member having a pair of diametrically disposed apertures adjacent each end thereof with a pair of tubular end members one for each end of the tubular body member, each of said end members being provided with a plurality of apertures, a selected aperture in each end member registering with an adjacent aperture in the tubular body member, the length of the roll depending upon which apertures are selected, means extending through said registering apertures to hold the end members in adjusted position with respect to the tubular body member, said end members terminating in a tapered frustum-conical portion provided with an aperture axially aligned with respect to the longitudinal axis of the tubular body member, a pintle fixedly secured to and projecting through the aperture in the end of one end member, and a spring actuated pintle adjustably mounted in the aperture of the other end member so as to provide an extendable and retractable bearing, the effective length of the rolls being adjustable by selecting another pair of apertures in one end member for registering with the apertures in the tubular body member.

3. An adjustable screen assembly adapted to be removably attached to a mounting by the use of a pair of parallel rolls adjusted in unison, each of said rolls including a tubular body member, a tubular end member adjustably mounted in telescopic relation with respect to the end of the tubular body member, one of said members having an aperture, the other member having a plurality of apertures one of which registers with the aperture in said one member permitting adjustment of said members relative to each other, means extending through said registering apertures for securing said members in adjusted position, a second end member mounted in telescopic relation with respect to the other end of said tubular body member, means for holding said second end member in fixed relation with respect to the tubular body member, each of said end members being provided with a tapered frustum-conical portion provided with a centrally disposed aperture aligned with respect to the longitudinal axis of the tubular body member, and pintles mounted in the apertures in the ends of said end members functioning as journals for the roll.

JOHN MUHR.